(12) United States Patent
Meyer et al.

(10) Patent No.: US 9,386,536 B2
(45) Date of Patent: Jul. 5, 2016

(54) ADAPTING OUTPUT POWER OF A RADIO TRANSMITTER

(71) Applicant: Telefonaktiebolaget L M Ericsson (publ), Stockholm (SE)

(72) Inventors: Michael Meyer, Aachen (DE); Joachim Sachs, Sollentuna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 198 days.

(21) Appl. No.: 14/039,624

(22) Filed: Sep. 27, 2013

(65) Prior Publication Data

US 2014/0094214 A1 Apr. 3, 2014

Related U.S. Application Data

(60) Provisional application No. 61/707,139, filed on Sep. 28, 2012.

(51) Int. Cl.
*H04W 52/24* (2009.01)
*H04W 52/46* (2009.01)

(52) U.S. Cl.
CPC .......... *H04W 52/242* (2013.01); *H04W 52/46* (2013.01); *H04W 52/244* (2013.01)

(58) Field of Classification Search
CPC ...... H04B 7/15; H04W 52/242; H04W 52/46; H04W 16/20; H04W 24/00; H04W 88/06; G01S 5/0252; H04L 12/2602; H04L 41/5003
See application file for complete search history.

(56) References Cited

U.S. PATENT DOCUMENTS

| | | | |
|---|---|---|---|
| 7,406,300 B2* | 7/2008 | Pan .............................. | 455/111 |
| 2005/0043933 A1* | 2/2005 | Rappaport et al. ................ | 703/1 |
| 2005/0285792 A1* | 12/2005 | Sugar et al. ................... | 342/465 |
| 2009/0279519 A1 | 11/2009 | Brisebois et al. | |
| 2010/0258746 A1* | 10/2010 | Na et al. ..................... | 250/493.1 |
| 2012/0315894 A1* | 12/2012 | Dussmann .................... | 455/424 |
| 2013/0157680 A1* | 6/2013 | Morita et al. .............. | 455/452.2 |
| 2013/0295926 A1* | 11/2013 | Michel et al. ................. | 455/434 |
| 2014/0134944 A1* | 5/2014 | Schwengler et al. ........... | 455/14 |

FOREIGN PATENT DOCUMENTS

| | | |
|---|---|---|
| EP | 1622287 A2 | 2/2006 |
| WO | 2013083198 A1 | 6/2013 |

* cited by examiner

*Primary Examiner* — Sujatha Sharma
(74) *Attorney, Agent, or Firm* — Coats & Bennett, PLLC

(57) ABSTRACT

Methods and apparatus are disclosed for improving radio transmissions between a mobile device located inside an enclosed structure and an outside radio network. A relay or repeater is used to relay transmissions back and forth between the inside mobile device and the outside radio network. The transmission power of the relay/repeater used to transmit signals to the mobile device and that of the mobile device used to communicate with the relay/repeater can be dynamically adjusted in accordance with the penetration loss of the enclosed structure.

42 Claims, 6 Drawing Sheets

ADAPTING OUTPUT POWER OF A RADIO TRANSMITTER

PRIORITY CLAIM

The present application claims priority to U.S. Provisional Application 61/707,139 filed on Sep. 28, 2012, the content of which is incorporated herein in its entirety.

TECHNICAL FIELD

The present invention relates to methods and apparatus for adapting the output power of a radio transmitter located within an enclosed structure.

BACKGROUND

The mobile broadband business is growing rapidly. User devices are becoming cheaper and data rates are reaching higher. New services and applications that could not be supported previously are becoming regular features. Those new services and applications may require constant or frequent access to a mobile network, for example, even when the user is in a vehicle such as a car, truck, train, or aircraft. Most often the vehicle is moving fast and is enclosed by metallic surfaces, which poses difficulties for a mobile device inside the vehicle communicating with a nearby mobile network. An enclosed vehicle resembles a Faraday cage and attenuates the radio transmissions to and from the vehicle due to the well-known Faraday cage effect. Besides vehicles, buildings having walls made of metallic materials or rooms partitioned out using metallic materials also make radio communication between an inside mobile device and an outside mobile network difficult.

Both repeaters and relays have been used to improve radio link quality and to increase coverage of a mobile network. The general idea of relaying is that a relay node (or simply relay) receives a transmission from a sender and forwards the transmission to the intended receiver. For example, the sender may be a base station or an evolved NodeB (eNB) and the intended receiver may be a mobile device or user equipment (UE), or vice versa. A repeater functions similarly as a relay. But there are some differences between the two. One of the differences is that a relay often decodes and reconstructs a transmission before forwarding while a repeater merely amplifies a received transmission before forwarding. A repeater generally receives, amplifies, and forwards a transmission without any link layer interactions, for instance, decoding. A repeater is sometimes referred to as a radio-frequency (RF) relay, or layer 1 (L1) relay. Term "L2 relay" or "L3 relay" are also used. The different layers refer to the layer of the protocol stack where the transmission is received, either by the relay or by the intended receiver.

It is known that a repeater or a relay node can be used in an enclosure, e.g., a building or a cage, to improve radio communication. A pick-up antenna outside the building or cage receives a radio signal and feeds the received radio signal to the repeater or relay. The repeater or relay may be located inside the enclosure. A second antenna inside the cage is used to transmit radio signals from the repeater or relay node to the intended mobile device or UE located inside the enclosure. Ideally, the transmissions between the second antenna and the mobile device are isolated within the enclosure and will not interfere with outside radio signals. Also the metallic surface of the enclosure attenuates outside radio signals and substantially reduces outside interference on the radio communication inside the enclosure. However, in general, the inside radio transmissions and the outside radio signals can't be perfectly decoupled. One reason is that the enclosure often has openings or apertures, for instance, lowered windows on a vehicle or opened doors of a building.

Nowadays, car windows are often treated with a metallic surface for various reasons. The position of a car window coated with a metallic surface affects both the transmissions of the relay/repeater located inside the car and the transmissions of a radio transmitter located outside the car. When the window is up, the two kinds of transmissions are decoupled to a certain degree. When the window is lowered, the transmissions from the inside relay/repeater interferes with outside radio signals. Also a nearby mobile device located outside the moving car may attempt to connect with the inside relay node/repeater, which may be only in transit. It is a challenging task to ensure that a relay/repeater located in a vehicle works properly in different scenarios and that an inside relay/repeater does not interfere with external radio communications.

There is a need for advanced techniques that can be used to improve radio link performance for a radio transmitter located within an enclosure.

SUMMARY

The present invention relates to adapting the output power of a radio transmitter or a radio transceiver located inside an enclosed structure or enclosure.

In some embodiments, a method of improving radio link performance for a wireless node located inside an enclosure is disclosed. The wireless node comprises a radio transceiver system. The method comprises determining a penetration loss due to a shielding effect of the enclosure. The method further comprises adapting the output power of the radio transceiver system based on the penetration loss.

In some embodiments, the wireless node may include a radio transceiver system, a first antenna system, a second antenna system, an estimation circuit, a power adaptation circuit. The radio transceiver system is configured to communicate with a base station and one or more mobile devices. The first antenna system may be located outside the enclosed structure while the second antenna system may be located inside the enclosed structure. The first antenna system is configured to communicate with an outside base station. The second antenna system is configured to communicate with one or more mobile devices located inside the structure. The estimation circuit is configured to estimate a penetration loss due to the shielding effect of the enclosed space. The power adaptation circuit is configured to adjust the output power of the radio transceiver system based on the estimated penetration loss. In some embodiments, the wireless node may include a storage device configured to store settings for different mobile devices. Optionally, the wireless node may further include a power control circuit. The power control circuit is configured to adjust the power control commands intended for the one or more mobile devices by taking into consideration of the determined penetration loss.

DETAILED DESCRIPTION

Figure 1:
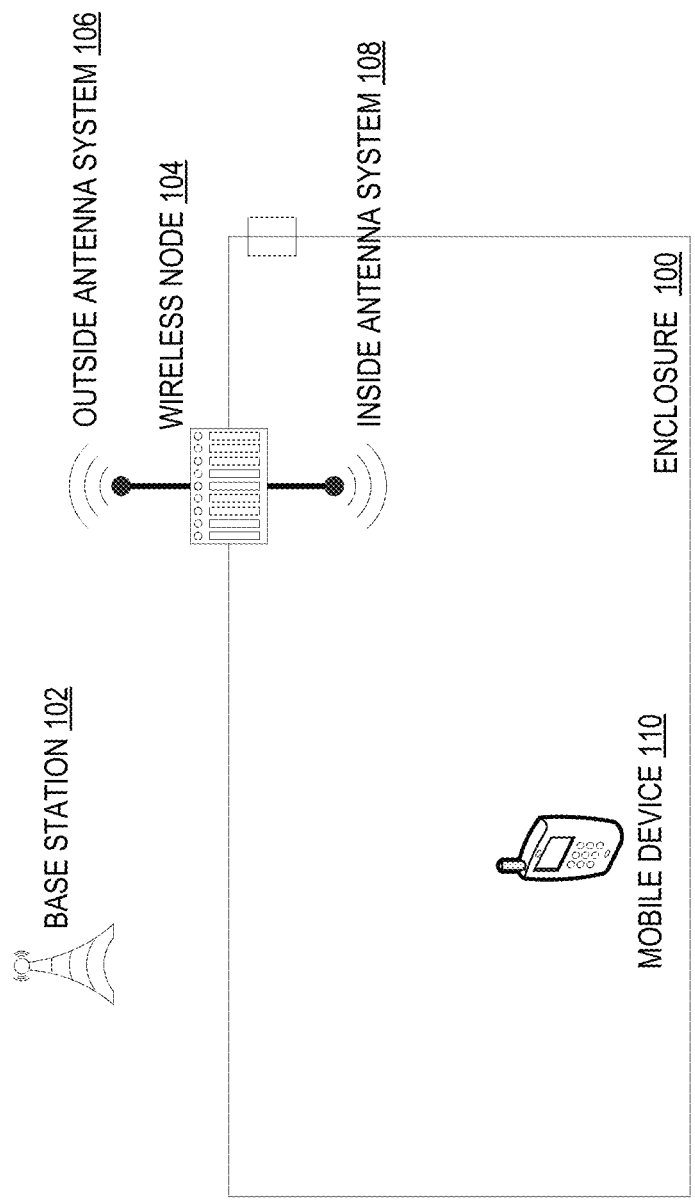
FIG. 1 illustrates an exemplary radio communication network comprising a wireless node with an antenna located within an enclosed structure.

FIG. 1 illustrates a mobile device 110 located in an enclosure 100 and served by a wireless node 104. The enclosure 100 represents a vehicle, a building, a cabin, a room, etc. The wireless node 104 may be a (L1/L2/L3) relay or a repeater. The wireless node 104 includes an outside antenna system 106 and an inside antenna system 108. The outside antenna system 106, located outside the enclosure 100, is used for communicating with outside radio nodes, e.g., a base station 102. The base station provides radio access to a wireless network (not shown). To communicate with the base station 102, the mobile device 100 inside the enclosure 100 relies on the wireless node 104 to relay radio signals to and from the base station 102.

The outside antenna system 106 receives the radio signals intended for the mobile device 110. With or without being processed by the wireless node 104, the received radio signals are relayed or forwarded by the inside antenna system 108 to the mobile device 110. The outside antenna system 106 can also transmit radio signals on behalf of the mobile device 110. The inside antenna system 108 receives radio signals from the mobile device 110 and the outside antenna system 106 relays or forwards the received signals to the base station 102.

Figure 2:
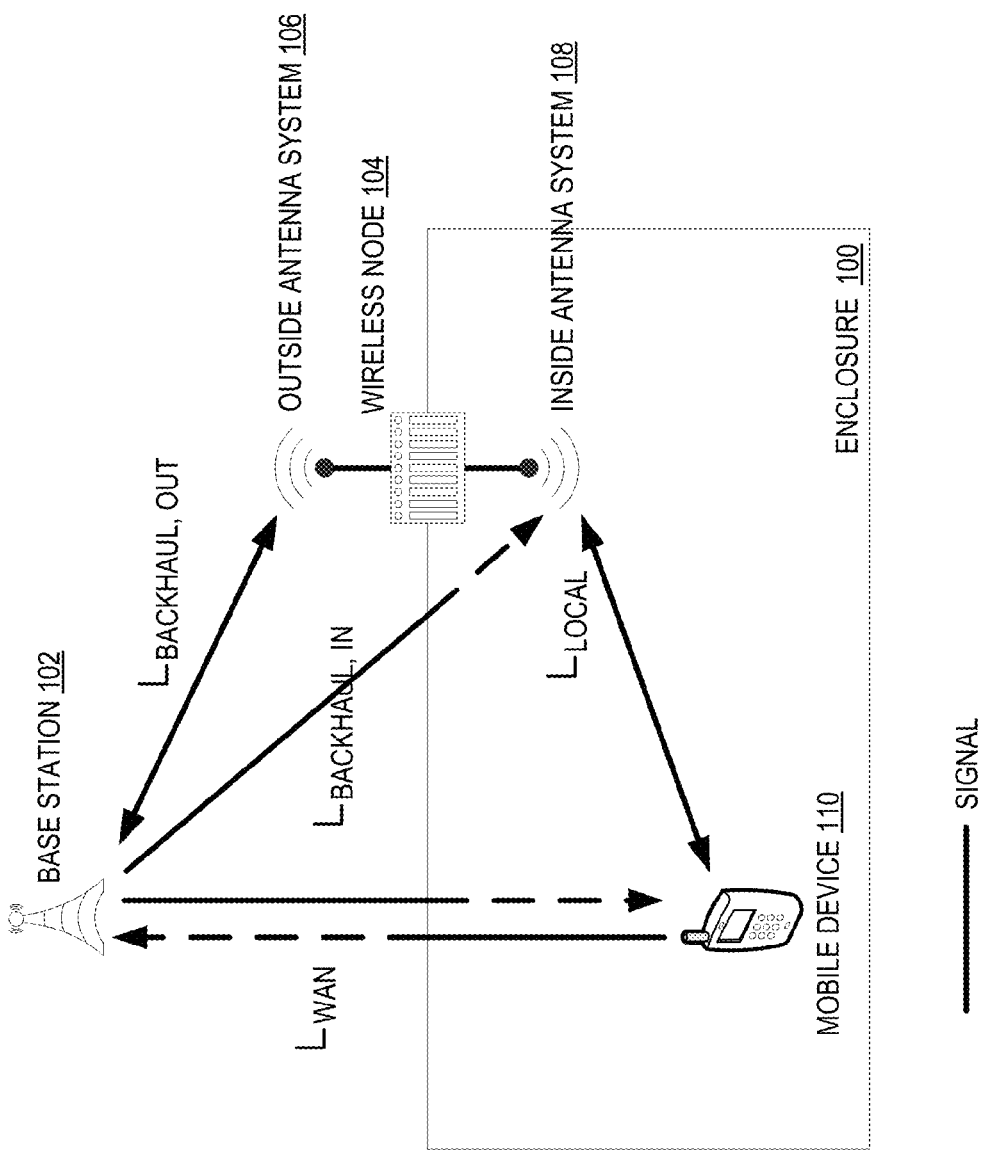
FIG. 2 illustrates radio transmissions between different radio transceivers in an exemplary radio communication network.

FIG. 2 illustrates different radio transmissions taking place over the various radio links between the wireless node 104, the mobile device 110, and the base station 102. In the present application, the radio link between the wireless node 104 and the base station 102 is referred to as the backhaul link. The radio link between the wireless node 104 and the mobile device 110 is referred to as the local link. And the radio link between the wireless device 110 and the base station 102 is referred to as wide area network (WAN) link. Following the same convention, the radio transmissions transmitted between the base station 102 and the outside antenna system 106 of the wireless node 104 are labeled as $L_{backhaul,out}$. The radio transmissions transmitted by the base station 102 and received by the inside antenna system 108 are labeled as $L_{backhaul,in}$. The radio transmissions between the base station 102 and the mobile device 110 are labeled as $L_{WAN}$. Radio transmissions $L_{backhaul,out}$ and $L_{WAN}$ can be either downlink or uplink.

Radio transmission $L_{backhaul,in}$ and downlink radio transmission $L_{backhaul,out}$ represent the same transmit signal as received by different antenna systems. Because a radio signal in $L_{backhaul,in}$ has to pass through the surface of the enclosure 100 before reaching the inside antenna system 108, the signal strength of $L_{backhaul,in}$ is relatively weak compared to downlink transmission $L_{backhaul,out}$. The difference represents the penetration loss incurred by the transmit signal when passing through the surface of the enclosure 100. Therefore, by comparing the signal strength of $L_{backhaul,in}$ and that of downlink transmission $L_{backhaul,out}$, a penetration loss of the enclosure 100 can be derived.

In some embodiments, the penetration loss of the enclosure 100 can also be derived using downlink radio transmission $L_{WAN}$ and downlink radio transmission $L_{backhaul,out}$. Downlink $L_{WAN}$ represents a radio signal transmitted by the base station 102 and received by the mobile device 110. The radio signal passes through the surface of the enclosure 100. A radio signal of downlink L backhaul,out does not pass through the surface. The difference between the signal strength of downlink $L_{WAN}$ and that of downlink $L_{backhaul,out}$ reflects the penetration loss caused by the enclosure 100. The penetration loss may be due to attenuation or reflection caused by the enclosure 100. The penetration loss could also include other well-known attritions caused by the enclosure 100. Similarly, uplink radio transmission $L_{WAN}$ and uplink radio transmission $L_{backhaul,out}$ can be used by the base station 102 to determine the penetration loss of the enclosure 100, after being adjusted by a power offset between the mobile device 110 and the outside antenna system 104.

In some embodiments, the penetration loss of the enclosure 100 may be calculated using downlink radio transmission $L_{WAN}$ and downlink radio transmission $L_{local}$. The difference between the signal strength of downlink $L_{WAN}$ and that of $L_{local}$, after being adjusted by an offset representing the power difference between the base station 102 and the wireless node 104, also reflects the penetration loss caused by the enclosure 100. In some embodiments, the penetration loss is determined by the wireless node 104. To learn of the signal strength of downlink transmission $L_{WAN}$ and $L_{local}$, which are received by the mobile device 110, the wireless node 104 can rely on measurement reports sent by the mobile device 110 to the serving bases station 102 and/or to the wireless node itself.

In some embodiments, the wireless node 104 can determine the penetration loss by sending a training signal from its outside antenna system 106 and measuring the training signal as received by its inside antenna system 108. The difference between the signal strength of these two signals reflects the penetration loss caused by the enclosure 100. Similarly, the wireless node 104 may direct the inside antenna system 108 to transmit a training signal and determine the penetration loss of the enclosure 100 based on the signal as received by the outside antenna system 106.

In some embodiments, the mobile device 110 may transmit a signal to the wireless node 104 for the purpose of determining the penetration loss of the enclosure 100. The signal may be received by both the inside antenna system 108, i.e., uplink transmission $L_{local}$ and the outside antenna system 106 (the corresponding signal not shown). By comparing the strength of these two received signals, the wireless node 104 can determine the penetration loss of the enclosure 100.

In some embodiments, the wireless node 104 can transmit signals to the mobile device from its inside antenna system 108 and occasionally from its outside antenna system 106. The mobile device 110 is configured to send channel quality reports to the wireless node 104 periodically. By observing the channel quality reports from the mobile device 110, the wireless node 104 can determine the difference between the signal strength of the signal received from the inside antenna system 108 and the signal strength of the signal received from the outside antenna system 106. After being adjusted by an offset representing the power disparity between the two antenna systems, the signal strength difference can be used to determine the penetration loss of the enclosure 100.

Similarly, the wireless node 104 can transmit signals to the base station 102 from the outside antenna system 106 (uplink $L_{backhaul,OUT}$) and occasionally from the inside antenna system 108 (not shown). Generally, the base station 102 is configured to send power control commands to control the uplink transmission power of a transmitter, based on the signal strength of the received uplink transmission power. When the wireless node 104 receives from the base station 102 separate power control commands for its outside antenna system 106 and its inside antenna system 108, the wireless node 104 can estimate the penetration loss of the enclosure 100 based on the power control commands. Methods and approaches for estimating a penetration loss of the enclosure 100 are not limited to the various embodiments disclosed herein. Other methods or approaches that are not explicitly described here but nonetheless are within the understanding or knowledge of a person skilled in the art may be used to estimate a penetration loss of an enclosure as well.

FIG. 2 illustrates only signals that are intended for the mobile device 110 and signals that are transmitted by the mobile device 110. The signals intended for the mobile device 110 either arrive directly at the mobile device 110 or are relayed to the mobile device 110. The signals transmitted by the mobile device 110 may be relayed to the base station 102 as well. FIG. 2 does not show any external radio nodes or devices other than the base station 102. However, radio transmissions between the inside antenna system 108 and the mobile device 110 can interfere with external radio communications, as shown in FIG. 3.

Figure 3:
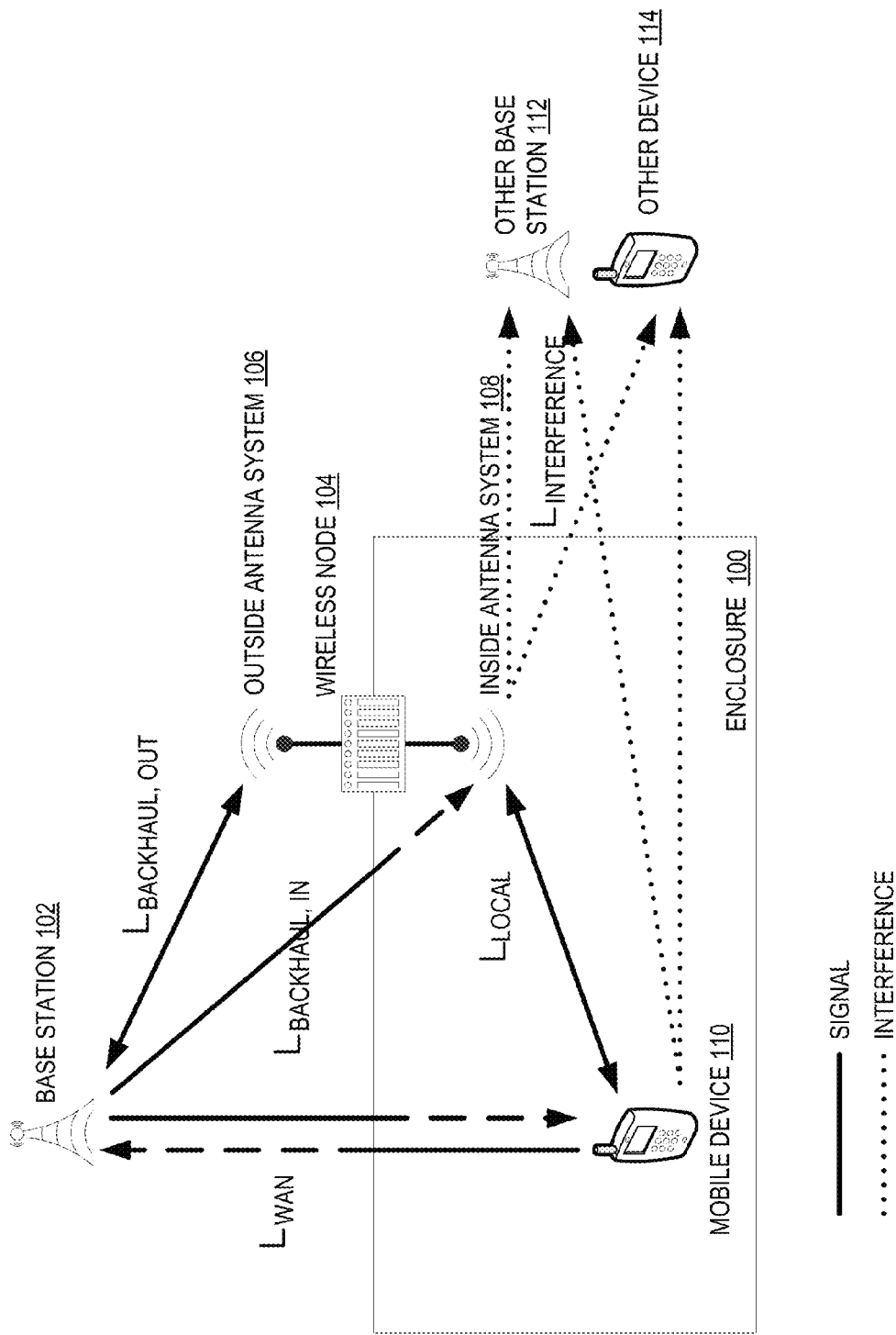
FIG. 3 illustrates various interfering transmissions experienced by radio nodes located outside an enclosure.

FIG. 3 includes a base station 112 and a mobile device 114 located outside the enclosure 100. In FIG. 3, radio signals are represented by solid lines and interfering transmissions are designated by dotted lines. Dashed lines are used to represent attenuated transmissions, i.e., transmissions that have passed through the surface of the enclosure 100 and have incurred a penetration loss.

In FIG. 3, $L_{backhaul,out}$, $L_{backhaul,in}$, $L_{local}$, and $L_{WAN}$ represent the same radio transmissions as shown in FIG. 2. Because the decoupling effect of the enclosure 100 is imperfect, the transmissions from the inside antenna system 108 can be detected or "felt" by radio nodes or devices located outside the enclosure 100, for example, the base station 112 and the mobile device 114. The radio transmissions inside the enclosure 100 may interfere with radio communications between the base station 112 and the mobile device 114. The level of interference caused by the internal radio transmissions on the external radio network depends on the penetration loss of the enclosure 100. To reduce such interference, the mobile device 110 and/or the inside antenna system 108 (i.e., the transmitter associated with the inside antenna system 108) can adopt a lower transmission power when the penetration loss is low. When the penetration loss is low, interfering signals remain strong after passing through the surface of the enclosure. The mobile device 114 and the wireless node 112 would experience relatively strong interference. Therefore, it is desirable to lower the transmission power of the inside antenna system 108 and/or the mobile device 110. Conversely, when the penetration loss is high, the mobile device 114 or the wireless node 112 would experience relatively weak interference. Therefore, the transmission powers of the devices or nodes located inside the enclosure, e.g., 108 and 110, can be set to a relatively high level.

In some embodiments, the transmission power of the mobile device 110 or the inside antenna system 108 may be dynamically adjusted in dependence on the penetration loss caused by the enclosure. In some embodiments, the wireless node 104 is configured to continuously adapt the transmission power of the inside antenna system 108 based on the penetration loss of the enclosure. The transmission power of the inside antenna system 108 may be increased when the penetration loss of the enclosure increases. The transmission power of the inside antenna system 108 may be decreased when the penetration loss of the enclosure decreases.

In some embodiments, the wireless node 104 is configured to switch on or off the inside antenna system 108 based on the penetration loss of the enclosure. When the penetration loss is strong, radio transmissions from the inside antenna system 108 are attenuated and do not interfere strongly with radio nodes or devices located outside the enclosure 100, for example, the base station 112 and the mobile device 110. In such case, the wireless node 104 turns on the inside antenna system 108. When the penetration loss is low, the wireless node 104 turns off the inside antenna system 108 to prevent interfering with external radio networks.

Besides the transmission power of the inside antenna system 108, the transmission power of the mobile device 110 can also be adapted in accordance with the penetration loss. Normally, the mobile device 110 receives a power control command from the base station 102 to direct the mobile device 110 to set an appropriate power level. For example, the base station 102 may direct the mobile device 110 to increase or decrease transmission power. Because the power control command is received and forwarded by the wireless node 104, the wireless node 104 can intercept and modify the power control command based on the penetration loss.

The penetration loss can be pre-determined based on the shape, the material, and the configuration of the enclosure 100. The penetration loss can also be measured using the signal strength of the various radio transmissions, such as $L_{backhaul,out}$, $L_{backhaul,in}$, $L_{local}$, and $L_{WAN}$ as described above. When the penetration loss of the enclosure 100 is high, for example, when all windows are rolled up or all doors are closed, the interference experienced by devices located outside of the enclosure 100 will be low as a result. Therefore, the transmission power of either the wireless node 104 or the mobile device 110 can be set to a relatively high level. On the other hand, when the penetration loss of the enclosure 100 is low, for example, when one or more windows are down or when a door is left open, the transmission power of either the wireless node 104 or the mobile device 110 may need to be set at a relatively low level to avoid causing extensive interference on other nodes.

Figure 4:
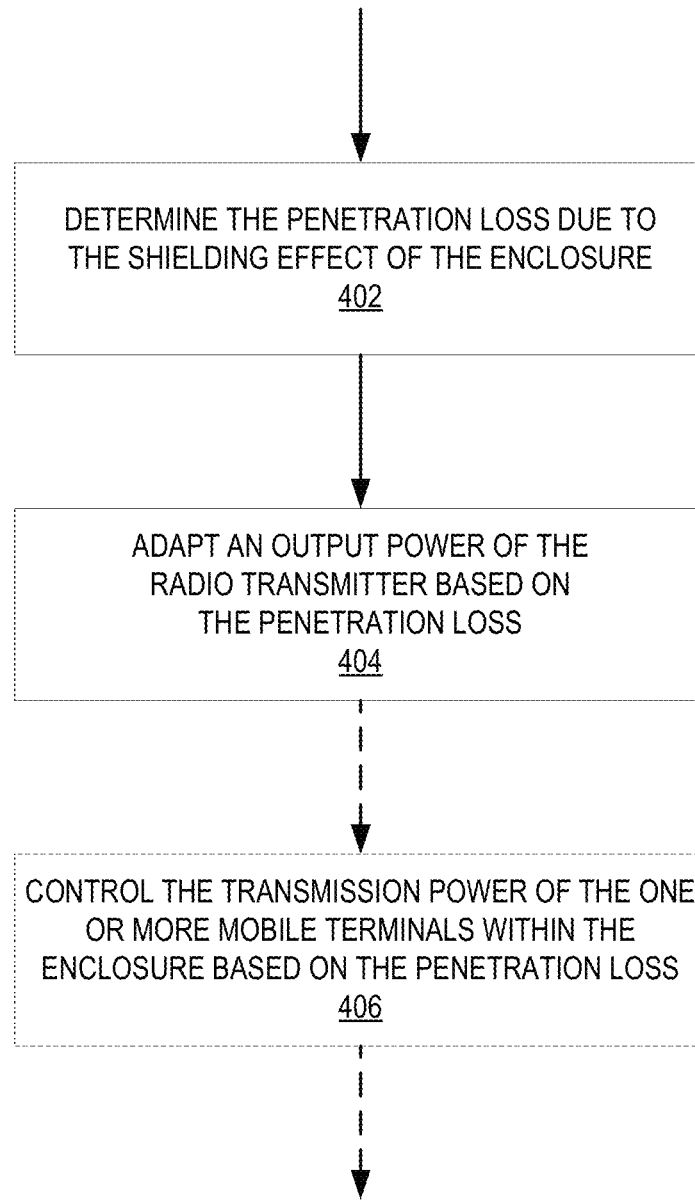
FIG. 4 is a flow chart illustrating an exemplary process of adapting the output power of a radio transceiver having an antenna located within an enclosed structure.

FIG. 4 illustrates an exemplary procedure for adapting the transmission power of the inside antenna system 108 of the wireless node 104. In step 402, the penetration loss due to the shielding effect of the enclosure 100 is determined. Based on the determined penetration loss, the output power of the inside antenna system 108 is adapted (step 404). The output power of the inside antenna system 108 may be determined using a mathematical formula or a table pre-determined using simulation or measurement data. In some embodiments, the output power of the inside antenna system 108 may be adjusted dynamically, for example, either continuously or intermittently. When the penetration loss caused by the enclosure 100 is variable, the output power of the inside antenna system 108 may be continuously adjusted. When in a more stable environment, for example, inside a building, the output power of the inside antenna system 108 may need to be adjusted only intermittently or simply be configured once during system configuration. Furthermore, the amount of adjustment made to the output power of the inside antenna system 108 may be continuous or discrete.

In some embodiments, the wireless node 104 is configured to switch the inside antenna system 108 on or off based on a measured penetration loss of the enclosure 100.

Figure 5:
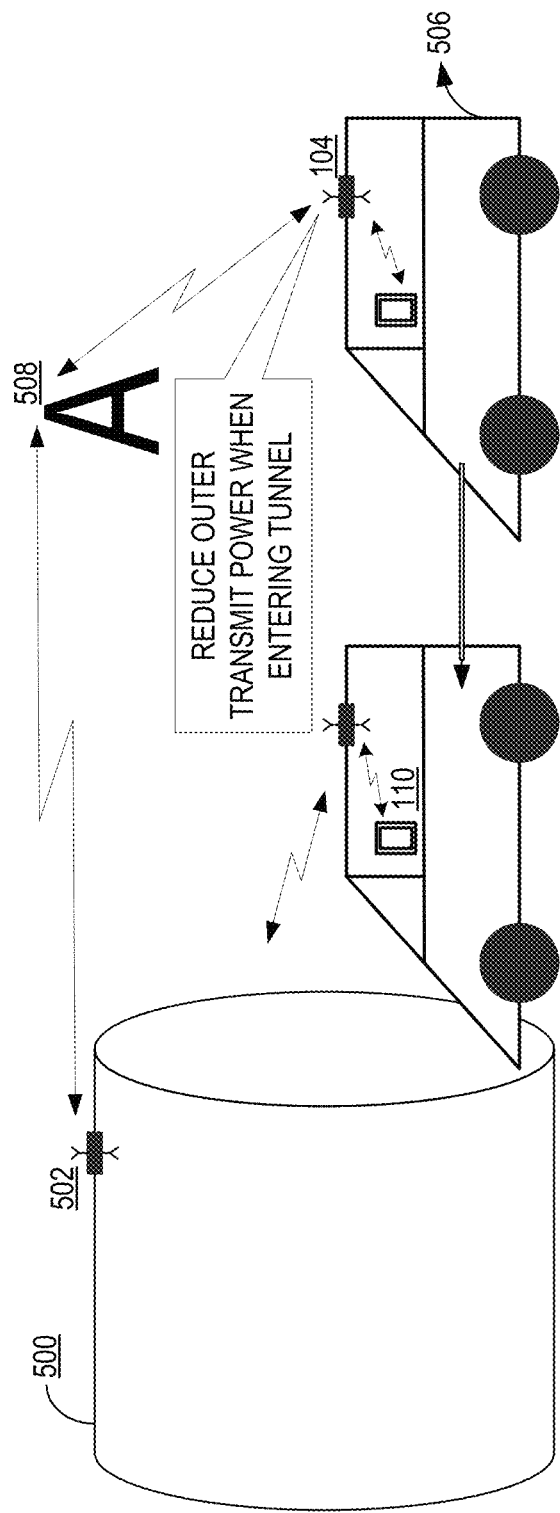
FIG. 5 illustrates a radio transceiver located inside a vehicle moving through a tunnel interacting with a relay/repeater installed in the tunnel.

In some embodiments, when the penetration loss is very low, the enclosure 100 essentially causes no attenuation on radio transmissions on both sides of the enclosure 100. Therefore, when the penetration loss is below a threshold, the wireless node 104 should turn off its transmission. In such case, the mobile device 110 communicates with the base station 102 directly. In some embodiments, if the wireless device 104 detects that a relay node or a repeater is located nearby, the wireless device 104 may also turn down or turn off its transmission. For example, in FIG. 5, a relay/repeater 502 is shown to be installed along a tunnel 500. The relay/repeater 502 facilitates communication between a wireless device located inside the tunnel 500 and an outside radio network 508. As a vehicle 506 approaches the tunnel 500, the wireless node 104 may be configured to detect the presence of the repeater/relay node 502. In response, the wireless node 104 turns down or off its own transmission. As a result, the mobile device 110 inside the vehicle uses the relay node/repeater 502 to communicate with the base station 508.

As described above, the wireless node 104 can control its own output power based on a determined penetration loss of the enclosure 100. In addition, the wireless node 104 can control the transmission power of the mobile device 110 and other mobile devices located within the enclosure 100 based on the determined penetration loss (step 406 in FIG. 4). In some embodiments, the wireless node 104 intercepts a power control command used by the base station 102 to set the level of transmission power of the mobile device 110. The wireless node adjusts the intercepted power control command based on the determined penetration loss.

In the above description, only one mobile device 110 is shown and discussed. It is noted that any number of mobile devices 110 can be configured and supported by the above described methods and apparatus. The wireless node 104 can be configured to intercept and modify the power control command for one mobile device. Alternatively, the wireless node 104 can intercept and modify the power control command for two or more mobile devices. In one embodiment, the wireless device 104 can use the same power control command for every mobile device. However, transmissions to and from a particular mobile device may experience different penetration losses depending on the location of the mobile device, due to the inhomogeneous shielding effect of the enclosure. In another embodiment, the wireless device 104 determines a penetration loss for each mobile device based on the location of the mobile device within the enclosure 100 and determines a power control command to account for the penetration loss determined for that particular mobile device.

Unlike the mobile device 110 or the inside antenna system 108, which is affected by the shielding effect of the enclosure 100, the outside antenna system 106 in general is not affected by the enclosure 100. When there are two or more mobile devices inside the enclosure 100, the transmission power of the outside antenna system 106 can be adjusted to accommodate all mobile devices located inside the enclosure 100. The transmission power of the outside antenna system 106 can also be adjusted on a per-device basis. For example, depending on which mobile device the outside antenna system 106 is transmitting on behalf of, the transmission power of the outside antenna system 106 can be adjusted in accordance to the power control command the base station 102 sends to that particular mobile device.

In the above described embodiments, the multiple mobile devices located inside the enclosure 100 are connected to the same base station 102. In other embodiments, the multiple mobile devices may be served by different base stations. The transmission power of the outside antenna system 106 will be adjusted not only in accordance to the power control command directed to a mobile device but also in dependence on the base station serving the mobile device.

Figure 6:
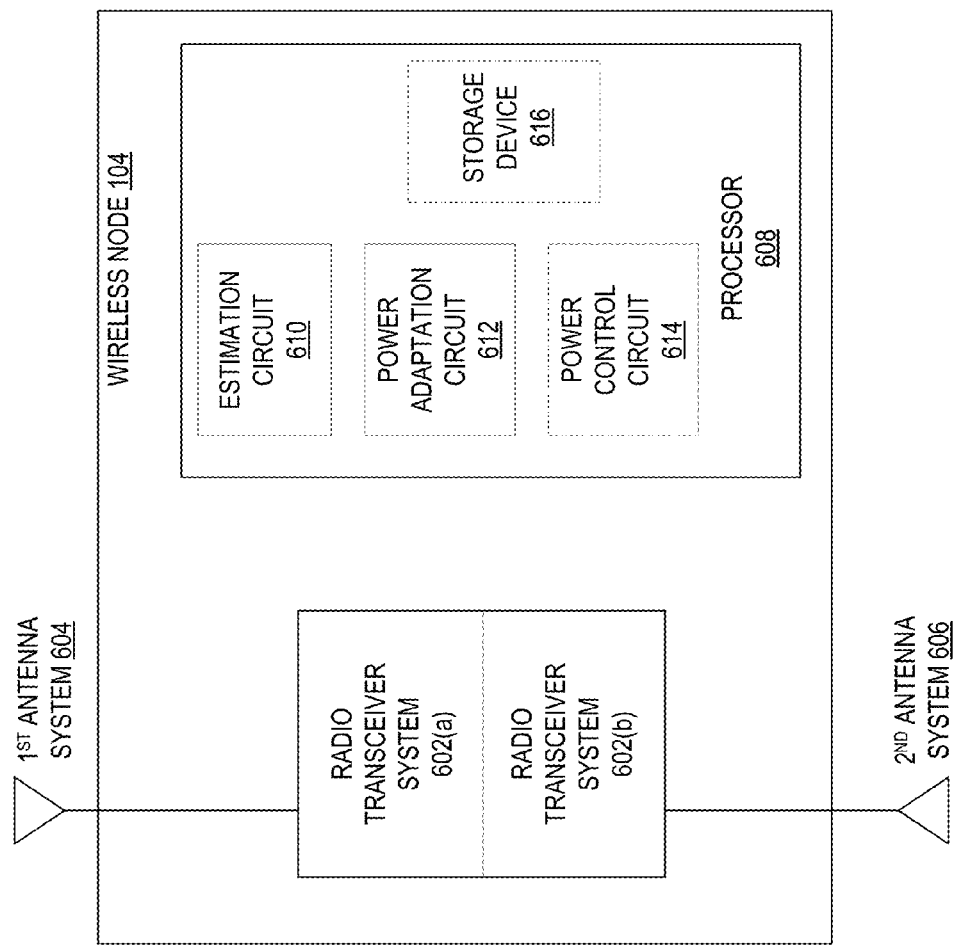
FIG. 6 illustrates an exemplary radio transceiver configured to transmit with adaptive output power in accordance with the configuration of the enclosed structure in which the radio transceiver is located.

FIG. 6 illustrates an exemplary wireless node 104 implemented as a relay or repeater. The wireless node 104 comprises radio transceiver systems 602(*a*) and 602(*b*), and a processor 608. The radio transceiver systems 602(*a*) and 602(*b*) further include a first antenna system 604 and a second antenna system 606. The radio transceiver system 602(*a*) is configured to communicate with other wireless nodes such as the base station 102 or the relay node/repeater 502 via the first antenna system 604. The radio transceiver system 602(*b*) is configured to communicate with mobile devices such as the mobile device 110 via the second antenna system 606. The wireless node 104 may be installed on the surface of the enclosure 100, inside or outside the enclosure 100. The first antenna system 604 is located inside the enclosure and the second antenna system 606 is located outside the enclosure 100.

The processor 608 of the wireless node 104 further comprises an estimation circuit 610, a power adaptation circuit 612, and a storage device 616. The estimation circuit 610 is configured to estimate a penetration loss caused by the enclosure 100. The power adaptation circuit 612 is configured to adapt an output power of the wireless node 104, which may include the output power of the first antenna system 604 and/or the output power of the second antenna system 606. The storage device 616 may be configured to store different settings for different mobile devices located inside the enclosure 100. Depending on the mobile device which the wireless node 104 is transmitting with or on behalf of, the power adaptation circuit 612 may adapt the output power of the wireless node 104 based on the mobile device's setting stored in the storage device 616. In some embodiments, the processor 608 may further comprise a power control circuit 614. The power control circuit 614 is configured to control the transmission power of the mobile device 104 by adjusting a power control command based on a determined penetration loss.

The present invention may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive, and all changes coming within the meaning and equivalency range of the appended claims are intended to be embraced therein.

What is claimed is:

1. A method of improving radio communications of a wireless node, said wireless node including a radio transceiver and said radio transceiver including a first antenna located within an enclosure, comprising:
   determining a penetration loss due to a shielding effect of the enclosure; and
   adapting an output power of the radio transceiver based on the penetration loss to reduce interference with one or more transceivers outside the enclosure by:
      turning off the output power of the radio transceiver when the penetration loss is below a first threshold; or
      maintaining a constant power level of the output power of the radio transceiver when the penetration loss is above a second threshold.

2. The method of claim 1, wherein the wireless node is a relay or repeater.

3. The method of claim 1, wherein the output power of the radio transceiver is a transmission power used by the radio transceiver to communicate with a mobile device located inside the enclosure via the antenna.

4. The method of claim 1, wherein the adapting of the output power of the radio transceiver based on the penetration loss comprises:
increasing the output power when the penetration loss is high; and
decreasing the output power when the penetration loss is low.

5. The method of claim 1, wherein the determining of the penetration loss of the enclosed space comprises:
obtaining a first signal strength of a downlink signal from a base station received at a second antenna of the wireless node located outside the enclosure;
receiving a second signal strength from a mobile device located inside the enclosure, wherein the second signal strength is an estimated signal strength of a downlink signal received by the mobile device from the base station; and
calculating a difference between the first signal strength and the second signal strength to determine the penetration loss of the enclosure.

6. The method of claim 1, wherein the determining of the penetration loss of the enclosure comprises:
receiving a first signal and a second signal by a receiving antenna located inside the enclosure, wherein the first signal is transmitted by a first radio transmitter located inside the enclosure and the second signal is transmitted by a second radio transmitter located outside the enclosure;
estimating a first signal strength of the first signal and a second signal strength of the second signal;
calculating a difference between the first signal strength and the second signal strength; and
determining the penetration loss of the enclosure based on the calculated difference and a power offset between the first radio transmitter and the second radio transmitter.

7. The method of claim 6, wherein the receiving antenna is a receiving antenna of a mobile device and wherein the first signal is transmitted by the first antenna of the wireless node and the second signal is transmitted by a second antenna of the wireless node located outside the enclosure.

8. The method of claim 6, wherein the receiving antenna is a receiving antenna of a mobile device and wherein the first signal is transmitted by an antenna of the wireless node located inside the enclosure and the second signal is transmitted by a base station located outside the enclosure.

9. The method of claim 1, wherein the determining of the penetration loss of the enclosure comprises:
receiving a first signal by the first antenna of the wireless node located inside the enclosure;
receiving a second signal by a second antenna of the wireless node located outside the enclosure;
estimating a first signal strength of the first signal and a second signal strength of the second signal;
calculating a difference between the first signal strength and the second signal strength; and
determining the penetration loss of the enclosure based on the calculated difference.

10. The method of claim 9, wherein the first signal and the second signal are transmitted by a mobile device located inside the enclosure.

11. The method of claim 9, wherein the first signal and the second signal are transmitted by a base station located outside the enclosure.

12. The method of claim 1, wherein the determining of the penetration loss comprises:
transmitting a signal by the wireless node from an antenna of the wireless node located on one side of the enclosure;
receiving the signal by another antenna of the wireless node located on a different side of the enclosure;
estimating the signal strength of the transmitted signal and the signal strength of the received signal; and
determining the penetration loss based on a difference between the signal strengths.

13. The method of claim 1, wherein the determining of the penetration loss comprises:
receiving channel quality reports from a mobile device located inside the enclosure;
determining a first signal strength of a first signal that is transmitted to the mobile device from within the enclosure based on the channel quality reports;
determining a second signal strength of a second signal that is transmitted to the mobile device from outside the enclosure based on the channel quality reports; and
deriving the penetration loss of the enclosure based on the first and second signal strengths and a power offset.

14. The method of claim 1, wherein the determining of the penetration loss comprises:
transmitting a first signal from the first antenna of the wireless node located inside the enclosure;
transmitting a second signal from a second antenna of the wireless node located outside the enclosure;
estimating a first signal strength of the first signal and a second signal strength of the second signal; and
determining the penetration loss based on the first and second signal strength.

15. The method of claim 14, wherein the first signal and the second signal are received by a base station located outside the enclosure and wherein the estimating of the first and second signal strength is based on power control commands received from the base station.

16. The method of claim 14, wherein the first signal and the second signal are received by a mobile device located inside the enclosure and wherein the estimating of the first and second signal strength is based on channel quality reports from the mobile device.

17. The method of claim 1, further comprising:
detecting a transmission from a radio transmitter located outside the enclosure when the wireless node is moving relative to the radio transmitter;
when the detected transmission becomes stronger than a first threshold, turning off the output power of the radio transceiver of the wireless node; and
when the detected transmission becomes weaker than a second threshold, turning on the output power of the radio transceiver of the wireless node.

18. The method of claim 1, further comprising:
receiving a power setting signal from a base station, said power setting signal being directed to one or more mobile devices located within the enclosure;
adjusting the power setting signal based on the penetration loss to generate a power control command; and
transmitting the power control command to the one or more mobile devices located within the enclosure.

19. The method of claim 18, wherein the power control command transmitted to each of the one or more mobile devices is individually adjusted according to the shielding effect experienced by the corresponding mobile device.

20. The method of claim 18, wherein the power control command transmitted to each of the one or more mobile devices is further adjusted in accordance to stored settings of the one or more mobile devices, wherein said stored settings specify power transmission levels for the one or more mobile devices.

21. The method of claim 1, wherein determining the penetration loss due to the shielding effect of the enclosure includes comparing two signals, one signal having passed through the enclosure and one signal having not passed through the enclosure.

22. A wireless node located within an enclosure, comprising:
- a radio transceiver system configured to communicate with a base station and one or more mobile devices;
- a first antenna system located inside the enclosure and connected to the radio transceiver system, said first antenna system configured to transmit and receive signals to and from the base station and the one or more mobile devices;
- a second antenna system located outside the enclosure and connected to the radio transceiver system, said second antenna configured to transmit and receive signals to and from the base station and the one or more mobile devices;
- an estimation circuit configured to estimate a penetration loss due to a shielding effect of the enclosure; and
- a power adaptation circuit configured to adjust an output power of the radio transceiver system based on the penetration loss to reduce interference with one or more transceivers outside the enclosure, wherein the power adaptation circuit is further configured to:
    - turn off the output power of the radio transceiver system when the penetration loss is below a first threshold; or
    - maintain a constant power level of the output power of the radio transceiver system when the penetration loss is above a second threshold.

23. The wireless node of claim 22, wherein the wireless node is a relay or a repeater.

24. The wireless node of claim 22, wherein the output power of the radio transceiver is a transmission power of the first antenna system used by the radio transceiver to communicate with a mobile device inside the enclosure.

25. The wireless node of claim 24, wherein the power adaptation circuit is further configured to:
- increase the transmission power of the first antenna system when the penetration loss is high; and
- decrease the transmission power of the first antenna system when the penetration loss is low.

26. The wireless node of claim 22, wherein the estimation circuit is configured to:
- obtain a first signal strength of a downlink signal from a base station received at the second antenna system of the wireless node located outside the enclosure;
- receive a second signal strength from a mobile device located inside the enclosure, wherein the second signal strength is an estimated signal strength of a downlink signal received by the mobile device from the base station; and
- calculate a difference between the first signal strength and the second signal strength to determine the penetration loss of the enclosure.

27. The wireless node of claim 22, wherein the estimation circuit is configured to:
- receive a first signal and a second signal by a receiving antenna located inside the enclosure, wherein the first signal is transmitted by a first radio transmitter located inside the enclosure and the second signal is transmitted by a second radio transmitter located outside the enclosure;
- estimate a first signal strength of the first signal and a second signal strength of the second signal;
- calculate a difference between the first signal strength and the second signal strength; and
- determine the penetration loss of the enclosure based on the calculated difference and a power offset between the first radio transmitter and the second radio transmitter.

28. The wireless node of claim 27, wherein the receiving antenna is a receiving antenna of a mobile device and wherein the first signal is transmitted by the first antenna system of the wireless node and the second signal is transmitted by the second antenna system of the wireless node located outside the enclosure.

29. The wireless node of claim 27, wherein the receiving antenna is a receiving antenna of a mobile device and wherein the first signal is transmitted by the first antenna of the wireless node located inside the enclosure and the second signal is transmitted by a base station located outside the enclosure.

30. The wireless node of claim 22, wherein the estimation circuit is configured to:
- receive a first signal by the first antenna system of the wireless node located inside the enclosure;
- receive a second signal by a second antenna system of the wireless node located outside the enclosure;
- estimate a first signal strength of the first signal and a second signal strength of the second signal;
- calculate a difference between the first signal strength and the second signal strength; and
- determine the penetration loss of the enclosure based on the calculated difference.

31. The wireless node of claim 30, wherein the first signal and the second signal are transmitted by a mobile device located inside the enclosure.

32. The wireless node of claim 30, wherein the first signal and the second signal are transmitted by a base station located outside the enclosure.

33. The wireless node of claim 22, wherein the estimation circuit is configured to:
- transmit a signal by the wireless node from an antenna system of the wireless node located on one side of the enclosure;
- receive the signal by another antenna system of the wireless node located on a different side of the enclosure;
- estimate the signal strength of the transmitted signal and the signal strength of the received signal; and
- determine the penetration loss based on a difference between the signal strengths.

34. The wireless node of claim 22, wherein the estimation circuit is configured to:
- receive channel quality reports from a mobile device located inside the enclosure;
- determine a first signal strength of a first signal that is transmitted to the mobile device from within the enclosure based on the channel quality reports;
- determine a second signal strength of a second signal that is transmitted to the mobile device from outside the enclosure based on the channel quality reports; and
- derive the penetration loss of the enclosure based on the first and second signal strengths and a power offset.

35. The wireless node of claim 22, wherein the estimation circuit is configured to:
- transmit a first signal from the first antenna system of the wireless node located inside the enclosure;

transmit a second signal from the second antenna system of the wireless node located outside the enclosure;

estimate a first signal strength of the first signal and a second signal strength of the second signal; and determine the penetration loss based on the first and second signal strength.

36. The wireless node of claim 35, wherein the first signal and the second signal are received by a base station located outside the enclosure and wherein the first and second signal strength are estimated based on power control commands received from the base station.

37. The wireless node of claim 35, wherein the first signal and the second signal are received by a mobile device located inside the enclosure and wherein the first and second signal strength are estimated based on channel quality reports received from the mobile device.

38. The wireless node of claim 22, wherein the power adaptation circuit is configured to:

detect a transmission from a radio transmitter located outside the enclosure when the wireless node is moving relative to the radio transmitter;

when the detected transmission becomes stronger than a first threshold, turning off the output power of the radio transceiver of the wireless node; and when the detected transmission becomes weaker than a second threshold, turning on the output power of the radio transceiver of the wireless node.

39. The wireless node of claim 22, wherein the wireless node further comprises a power control circuit and wherein the power control circuit is further configured to:

receive a power setting signal from a base station, said power setting signal being directed to one or more mobile devices located within the enclosure;

adjust the power setting signal based on the penetration loss to form a power control command; and transmit a power control command to the one or more mobile devices located within the enclosed space to control the transmission power of the one or more mobile devices.

40. The wireless node of claim 22, wherein the power control command transmitted to each of the one or more mobile devices is individually adjusted according to the shielding effect experienced by the corresponding mobile device.

41. The wireless node of claim 22, further comprising a storage device configured to store different settings for different mobile devices, wherein the different settings specify power transmission levels for the different mobile devices and are used by the power adaptation unit to adjust the output power of the radio transceiver system for different mobile devices.

42. The wireless node of claim 22, wherein determining the penetration loss due to the shielding effect of the enclosure includes the estimation circuit being further configured to compare two signals, one signal having passed through the enclosure and one signal having not passed through the enclosure.

* * * * *